United States Patent
Kim et al.

(10) Patent No.: US 11,550,053 B2
(45) Date of Patent: Jan. 10, 2023

(54) OBJECT DETECTION APPARATUS AND OPERATING METHOD THEREOF

(71) Applicant: HYUNDAI MOBIS CO., LTD., Seoul (KR)

(72) Inventors: Kyung Rin Kim, Yongin-si (KR); Sung Eun Jo, Yongin-si (KR); Won Gyum Kim, Yongin-si (KR); Young Shin Kim, Yongin-si (KR); Min Jae Cho, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 888 days.

(21) Appl. No.: 16/412,339

(22) Filed: May 14, 2019

(65) Prior Publication Data

US 2019/0353785 A1    Nov. 21, 2019

(30) Foreign Application Priority Data

May 15, 2018    (KR) .................... 10-2018-0055641

(51) Int. Cl.
  *G01S 17/04*    (2020.01)
  *G02B 26/12*    (2006.01)
  (Continued)

(52) U.S. Cl.
  CPC .......... *G01S 17/04* (2020.01); *G01S 7/4813* (2013.01); *G01S 7/497* (2013.01); *G01S 17/931* (2020.01); *G02B 26/12* (2013.01); *G02B 27/0006* (2013.01)

(58) Field of Classification Search
  CPC .............. G01S 17/04; G01S 17/931; G01S 2007/4977; G01S 7/4813; G01S 7/481;
  (Continued)

(56) References Cited

U.S. PATENT DOCUMENTS

| 6,124,937 A * | 9/2000 | Mittenzwey ......... G01N 21/031 356/432 |
| 2018/0009418 A1* | 1/2018 | Newman ................... B08B 3/02 |

(Continued)

FOREIGN PATENT DOCUMENTS

| DE | 102006057878 A1 * | 4/2008 | ............... G01V 8/20 |
| JP | 11173912 A * | 7/1999 | |

(Continued)

OTHER PUBLICATIONS

Korean Office Action dated Jul. 13, 2022, in Korean Patent Application No. 10-2018-0055641.

*Primary Examiner* — Seung C Sohn
(74) *Attorney, Agent, or Firm* — H.C. Park & Associates, PLC (57) ABSTRACT

A object detection apparatus may include: an object detection sensor having a cover for protecting the object detection sensor from foreign matter, and configured to sense a target object by transmitting a scan signal to the target object and receiving a sensing signal reflected from the target object; a protection film part including a protection film disposed on an outer surface of the cover to prevent contamination of the cover by foreign matter; and a control unit configured to replace the protection film disposed on the outer surface of the cover through a winding operation for the protection film part when a protection film replacement condition is satisfied due to contamination of the protection film, in order to prevent a reduction in sensing performance of the object detection sensor due to contamination by foreign matter.

10 Claims, 4 Drawing Sheets

(51) Int. Cl.
*G01S 17/931* (2020.01)
*G02B 27/00* (2006.01)
*G01S 7/481* (2006.01)
*G01S 7/497* (2006.01)

(58) Field of Classification Search
CPC . G01S 7/497; G01S 2007/4975; G02B 26/12; G02B 27/0006
USPC .......................................................... 356/5.01
See application file for complete search history.

(56) References Cited

U.S. PATENT DOCUMENTS

2018/0265048 A1* 9/2018 Schmidt .................... B08B 5/02
2020/0004264 A1* 1/2020 Lee ........................ B25J 19/023

FOREIGN PATENT DOCUMENTS

| | | |
|---|---|---|
| JP | H11-173912 | 7/1999 |
| JP | 2011-051716 | 3/2011 |
| KR | 20-0478535 | 10/2015 |
| KR | 10-2017-0124871 | 11/2017 |

\* cited by examiner

OBJECT DETECTION APPARATUS AND OPERATING METHOD THEREOF

CROSS-REFERENCES TO RELATED APPLICATION

This application claims priority from and the benefit of Korean Patent Application No. 10-2018-0055641, filed on May 15, 2018, which is hereby incorporated by reference for all purposes as if set forth herein.

BACKGROUND

Field

Exemplary embodiments relate to an object detection apparatus and an operating method thereof, and more particularly, to an object detection apparatus which can prevent a reduction in sensing performance of a sensor for sensing a target object, and an operating method thereof.

Discussion of the Background

An autonomous vehicle refers to a vehicle which autonomously decides a drive path by recognizing the surrounding environment through an outside information sensing and processing function during driving, and independently drives using it own power. Although a driver does not operate a steering wheel, an acceleration pedal, a brake or the like, the autonomous vehicle can travel to the destination by itself while preventing a collision with an obstacle on the drive path and adjusting a vehicle speed and a driving direction depending on the shape of a road. For example, the autonomous vehicle may perform acceleration on a straight road, and perform deceleration on a curved road while changing the driving direction in response to the curvature of the road.

A driver assistance system which is currently applied to a vehicle is configured as an individual system or includes a small number of systems to which a single sensor is applied. However, in order to implement a high-level autonomous driving system in the future, a high-precision sensor is expected to be applied. The need to apply a LiDAR (Light Detection And Ranging Sensor) with high distance resolution as a sensor for satisfying such a demand is increasing.

In general, a sensor such as the LiDAR which is applied to a vehicle to sense an outside object is mounted on the front bumper of the vehicle, and the sensing performance of the sensor may be significantly degraded when the sensor is mounted in a vehicle body or glass. Thus, the sensor is generally mounted so as to be extended to the outside, and has a separate cover for protecting the sensor from foreign matter.

Since the LiDAR senses an object through a method of transmitting/receiving light, the object sensing performance of the LiDAR is very sensitive to contamination of the cover for protecting the LiDAR from foreign matter. In the related art, a hot wire mounted in the cover only serves to remove outside moisture. Therefore, there is a demand for a device for fundamentally blocking the contamination of the sensor cover by foreign matter.

The above information disclosed in this Background section is only for enhancement of understanding of the background of the invention and, therefore, it may contain information that does not constitute prior art.

SUMMARY

Exemplary embodiments of the present invention are directed to an object detection apparatus which can prevent a reduction in sensing performance of a sensor for sensing a target object by fundamentally blocking contamination of a sensor cover by foreign matter, and an operating method thereof.

In one embodiment, an object detection apparatus may include: an object detection sensor having a cover for protecting the object detection sensor from foreign matter, and configured to sense a target object by transmitting a scan signal to the target object and receiving a sensing signal reflected from the target object, wherein the scan signal and the sensing signal are respectively transmitted and received through the cover; a protection film part including a protection film disposed on an outer surface of the cover to prevent contamination of the cover by foreign matter; and a control unit configured to replace the protection film disposed on the outer surface of the cover through a winding operation for the protection film part when a protection film replacement condition is satisfied due to contamination of the protection film, in order to prevent a reduction in sensing performance of the object detection sensor due to contamination by foreign matter.

The object detection apparatus may further include a roll unit configured to replace the protection film disposed on the outer surface of the cover by performing the winding operation for the protection film part, under control of the control unit.

When a contamination level of the protection film disposed on the outer surface of the cover at the moment is equal to or more than a preset threshold value, the control unit may determine that the protection film replacement condition is satisfied.

When the time that has elapsed since the protection film disposed on the outer surface of the cover was finally replaced is equal to or more than a preset reference value, the control unit may determine that the protection film replacement condition is satisfied.

The object detection sensor may include a LiDAR.

In another embodiment, there is provided an operating method of an object detection apparatus which includes: an object detection sensor having a cover for protecting the object detection sensor from foreign matter, and configured to sense a target object by transmitting a scan signal to the target object and receiving a sensing signal reflected from the target object, wherein the scan signal and the sensing signal are respectively transmitted and received through the cover; and a protection film part including a protection film disposed on an outer surface of the cover to prevent contamination of the cover by foreign matter. The operating method may include: determining, by a control unit, whether a protection film replacement condition is satisfied due to contamination of the protection film, and replacing, by the control unit, the protection film disposed on the outer surface of the cover through a winding operation for the protection film part when the protection film replacement condition is satisfied, in order to prevent a reduction in sensing performance of the object detection sensor due to contamination by foreign matter.

The determining of whether the protection film replacement condition is satisfied may include a first determination step in which the controller determines that the protection film replacement condition is satisfied, when a contamination level of the protection film disposed on the outer surface of the cover at the moment is equal to or more than a preset threshold value.

When it is determined that the contamination level of the protection film is less than the threshold value, the determining of whether the protection film replacement condition is satisfied may further include a second determination step in which the controller determines that the protection film replacement condition is satisfied, in the case that the time that has elapsed since the protection film disposed on the outer surface of the cover was finally replaced is equal to or more than a preset reference value.

The first determination step may be repeatedly performed according to a preset cycle, and the cycle may be equal to or less than the reference value.

The operating method may further include determining, by the control unit, whether there is a new protection film for replacing the protection film disposed on the outer surface of the cover, when it is determined that the protection film replacement condition is satisfied. In the replacing of the protection film, the control unit may replace the protection film disposed on the outer surface of the cover only when there is the new protection film.

The operating method may further include informing, by the control unit, a user that the protection film part needs to be replaced, when it is determined that there is no new protection film.

In accordance with the embodiments of the present invention, the object detection apparatus and the operating method thereof can fundamentally block not only contamination of the sensor over by foreign matter such as dust, dirt, or moisture, but also contamination such as a scratch which may occur on the cover, thereby preventing a reduction in sensing performance of the sensor.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principle of the invention.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Figure 1:
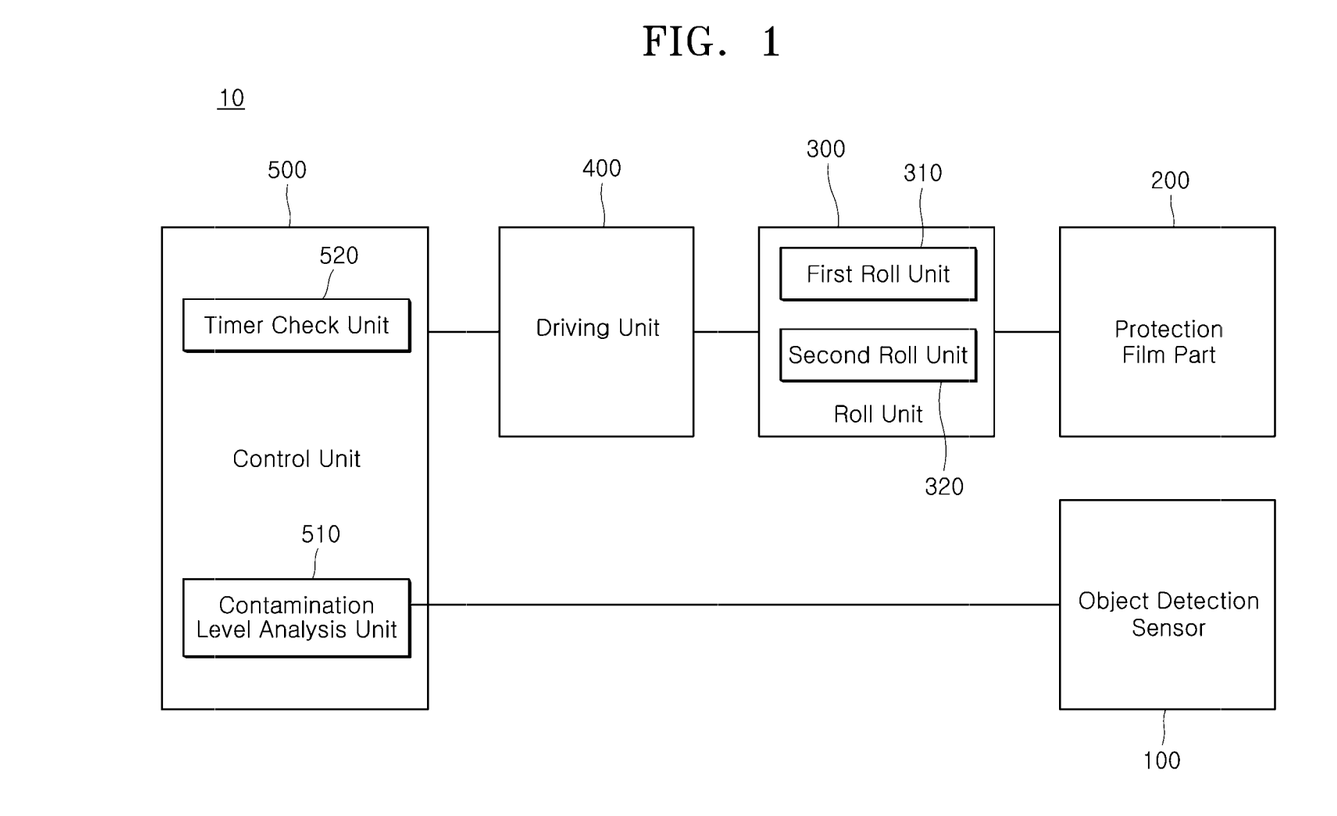
FIG. 1 is a block diagram illustrating an object detection apparatus in accordance with an embodiment of the present invention.
Figure 2:
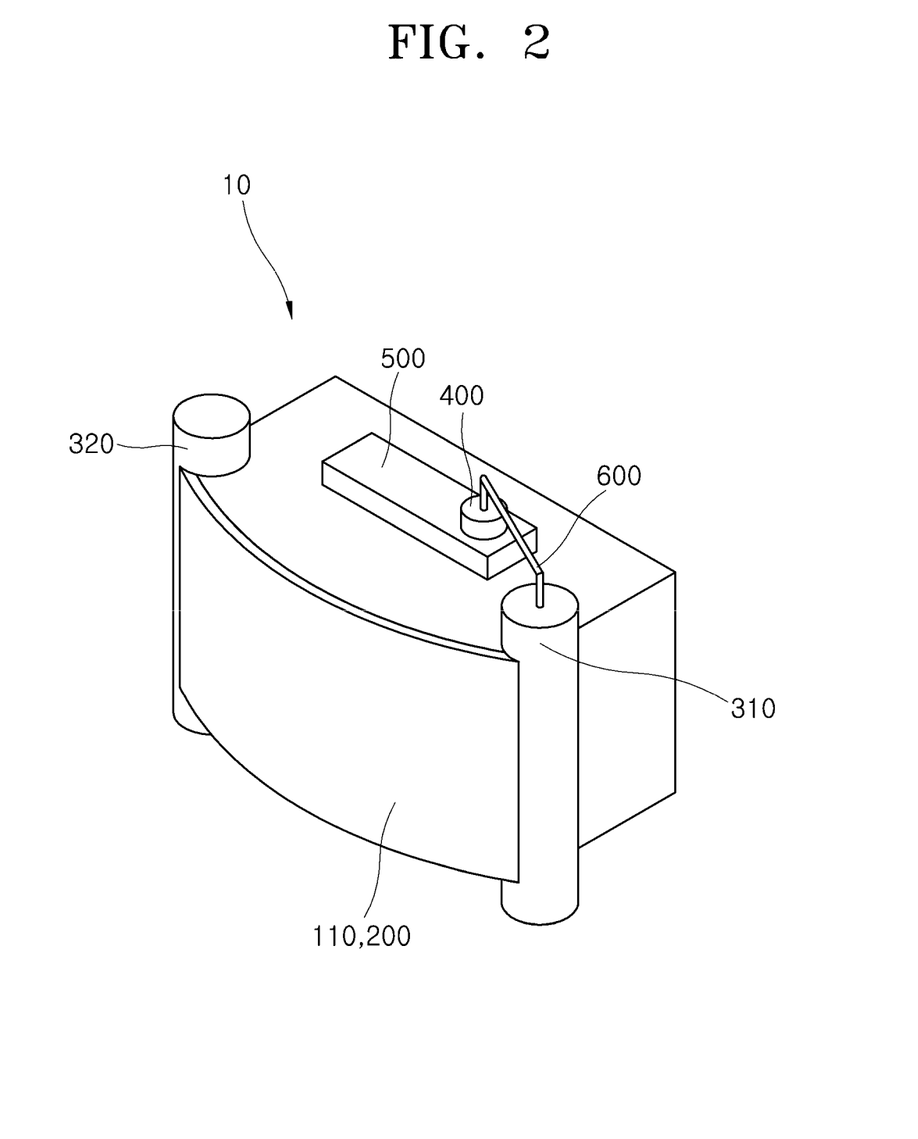
FIG. 2 illustrates an implementation of the object detection apparatus in accordance with the embodiment of the present invention.

FIG. 1 is a block diagram illustrating an object detection apparatus in accordance with an embodiment of the present invention, and FIG. 2 illustrates an implementation of the object detection apparatus in accordance with the embodiment of the present invention.

Referring to FIGS. 1 and 2, the object detection apparatus 10 in accordance with the embodiment of the present invention may include an object detection sensor 100, a protection film part 200, a roll unit 300, a driving unit 400 and a control unit 500. The roll unit 300 may include a first roll unit 310 and a second roll unit 320, and the control unit 500 may include a contamination level analysis unit 510 and a timer check unit 520.

In the present embodiment, it is described that the object detection apparatus 10 is applied to the front bumper of a vehicle, for convenience of description. However, the present invention is not limited thereto, but the object detection apparatus 10 in accordance with the present embodiment may be applied to all kinds of systems which can sense an outside object through a transmitted signal and a received signal.

The object detection sensor 100 may sense a target object by transmitting a scan signal to the target object and receiving a sensing signal reflected from the target object. The scan signal may be defined as a signal which the object detection sensor 100 transmits to sense the target object, and the sensing signal may be defined as a signal which is returned to the object detection sensor 100 after the scan signal has been reflected from the target object.

In the present embodiment, the object detection sensor 100 may include a LiDAR (Light Detection And Ranging Sensor). Thus, the object detection sensor 100 may include a laser diode, a mirror unit and a receiver unit. The laser diode may emit the scan signal. The mirror unit may adjust the scan angle of the object detection sensor 100 while the rotation angle thereof is adjusted by an actuator such as a motor, and transmit the scan signal emitted from the laser diode to the outside by reflecting the scan signal. The receiver unit may receive the sensing signal. Through the above-described configuration, the object detection sensor 100 may sense a target object by transmitting a laser point (i.e. scan signal) to the target object and measuring the time required until a sensing signal is reflected from the target object and returned to the object detection sensor 100 and the intensity of the sensing signal. That is, the object detection sensor 100 may detect the distance from the vehicle to the target object and the shape of the target object.

The object detection sensor 100 may include a cover 110 for protecting the object detection sensor 100 from foreign matter. The cover 110 may be positioned in the direction that the scan signal is transmitted from the object detection sensor 100 or the sensing signal is received by the object detection sensor 100, and house the laser diode, the mirror unit and the receiver unit therein. The cover 110 may be formed in various shapes depending on the shape of the object detection sensor 100 (for example, plane shape, curved shape and the like). FIG. 2 illustrates that a protection film to be described below is formed in a curved shape on the outer surface of the cover 110 as the cover 110 is formed in a curved shape.

Since the scan signal transmitted from the object detection sensor 100 and the sensing signal received by the object detection sensor 100 penetrate the cover 110, the object sensing performance of the object detection sensor 100 is very sensitive to contamination of the cover 110.

Therefore, the object detection apparatus in accordance with the present embodiment may employ the protection film part 200 to fundamentally block the contamination of the sensor cover by foreign matter, thereby preventing a reduction in sensing performance of the object detection sensor 100.

The protection film part 200 may include a protection film disposed on the outer surface of the cover 110 or formed to cover the outer surface of the cover 110, in order to prevent the cover 110 from being contaminated by foreign matter. In order to clearly distinguish between terms, the protection film part 200 may be defined as including the protection film disposed on the outer surface of the cover 110 and a protection film wound around the roll unit 300 which will be described below.

When a heating operation through a hot wire or a cleaning operation of cleaning the surface of the cover 110 by spraying a cleaning solution is employed as a method for protecting the surface of the cover 110 from contamination by foreign matter, foreign matter such as dust, dirt, or moisture on the surface of the cover 110 can be removed. In this case, however, there may be a limitation in completely cleaning the surface of the cover 110 depending on the types of foreign matter. Furthermore, the cover 110 may be exposed to such a risk that the outer surface thereof will be scratched by foreign matter. In other words, since a scratch formed on the outer surface of the cover 110 cannot be removed through the heating operation or the cleaning operation, it is necessary to fundamentally block such a scratch.

Therefore, in the present embodiment, the protection film may be disposed on the outer surface of the cover 110, thereby not only preventing the contamination of the cover 110 by foreign matter such as dust, dirt, or moisture, but also fundamentally blocking a scratch which may be formed on the cover 110.

The protection film part 200 may be formed of various materials as long as the materials can protect the outer surface of the cover 110 without distorting the above-described scan signal and sensing signal.

The roll unit 300 may replace the protection film disposed on the outer surface of the cover 110 by performing a winding operation for the protection film part 200, under control of the control unit 500. The roll unit 300 may be coupled to the driving unit 400 (for example, motor) through a gear unit 600. Thus, the roll unit 300 may perform a winding operation for the protection film part 200 through a rotation operation of the driving unit 400 driven by the control unit 500, in order to replace the protection film disposed on the outer surface of the cover 110.

For the above-described operation, the roll unit 300 may include a first roll unit 310 and a second roll unit 320 as illustrated in FIG. 2. The first roll unit 310 may be coupled to the driving unit 400 through the gear unit 600 and perform a winding operation for the protection film part 200 through the rotation operation of the driving unit 400. The second roll unit 320 may be rolled by an external force generated through the rolling operation of the first roll unit 310, and perform an unwinding operation for the protection film part 200. That is, the protection film which has been disposed on the outer surface of the cover 110 for a predetermined time and thus contaminated may be wound around the first roll unit 310. The second roll unit 320 may have a new protection film wound therearound to replace the protection film disposed on the outer surface of the cover 110, the new protection film indicating a protection film which has never been disposed on the outer surface of the cover 110. Thus, when the second roll unit 320 is rolled by the external force generated through the rolling operation of the first roll unit 310, the new protection film may be unwound and disposed on the outer surface of the cover 110.

When a protection film replacement condition is satisfied due to contamination of the protection film, the control unit 500 may replace the protection film disposed on the outer surface of the cover 110 through the winding operation for the protection film part 200, thereby preventing a reduction in sensing performance of the object detection sensor 100 due to contamination by foreign matter. The outer surface of the cover 110 may be defined as a surface of the cover 110, which abuts the outside of the vehicle. The control unit 500 may include the contamination level analysis unit 510 and the timer check unit 520 as sub components for determining whether the protection film replacement condition is satisfied due to contamination of the protection film.

The contamination level analysis unit 510 may determine that the protection film replacement condition is satisfied, when the contamination level of the protection film disposed on the outer surface of the cover 110 is equal to or more than a preset threshold value.

The contamination level of the protection film may refer to an indicator showing how much the protection film is contaminated, compared to a normal state in which the protection film is not contaminated. The contamination level analysis unit 510 may acquire the contamination level of the protection film through various methods. For example, the contamination level analysis unit 510 may acquire the contamination level of the protection film by quantitatively comparing a result obtained by detecting target objects around the vehicle through the object detection sensor 100 in the current state at the scan angle adjusted by the above-described mirror unit to an object detection result for the target objects around the vehicle, which is expected in a normal state in which the object detection sensor 100 is not contaminated. For example, the contamination level analysis unit 510 may acquire the contamination level of the protection film by quantitatively analyzing the number of target objects which are expected to be sensed in the normal state and the number of target object which are expected to be sensed in the normal state but not sensed by the object detection sensor 100 in the current state, and converting the analysis result into numerical values. At this time, a result obtained by sensing objects around the vehicle through other sensors such as a camera sensor, ultrasonic sensor and laser sensor, which are mounted in the vehicle, may be utilized as the object detection result for the target objects around the vehicle, which is expected in the normal state. When the contamination level acquired through the above-described process is equal to or more than the threshold value, the contamination level analysis unit 510 may determine whether the protection film replacement condition is satisfied. The threshold value may be designed in various manners based on a designer's intention and an experimental result, and set in the contamination level analysis unit 510 in advance.

The operation of the contamination level analysis unit 510 to determine whether the contamination level of the protection film disposed on the outer surface of the cover 110 at the moment is equal to or more than the threshold value may be performed once before the vehicle is driven after started up. Alternatively, the operation may be repeatedly performed according to a preset cycle during a driving process of the vehicle, which will be described below.

Whenever the protection film disposed on the outer surface of the cover 110 is replaced, the timer check unit 520 may reset a timer which has counted so far, and operate the timer to resume counting. Thus, when the time that has elapsed since the protection film disposed on the outer surface of the cover 110 was finally replaced is equal to or more than a preset reference value, the timer check unit 520 may determine that the protection film replacement condition is satisfied.

That is, when the time that has elapsed since the protection film disposed on the outer surface of the cover 110 was finally replaced is equal to or more that the preset reference value even though the contamination level of the protection film disposed on the outer surface of the cover 110 at the moment is less than the preset threshold value, the timer check unit 520 may determine that the protection film needs to be replaced, and determine that the protection film replacement condition is satisfied. In this case, the protection film disposed on the outer surface of the cover 110 may be replaced in advance, which makes it possible to prevent a situation in which a target object is not correctly detected due to contamination of the protection film disposed on the outer surface of the cover 110.

The operation of the contamination level analysis unit 510 to determine whether the contamination level of the protection film disposed on the outer surface of the cover 110 is equal to more than the threshold value may be repeatedly performed according to the preset cycle. At this time, the cycle may be equal to or less than the reference value.

That is, the contamination level analysis unit 510 may periodically determine whether the contamination level of the protection film disposed on the outer surface of the cover 110 at the moment is equal to or more than the preset threshold value, in order to replace the protection film. When the timer check unit 520 determines that the time that has elapsed since the protection film disposed on the outer surface of the cover 110 was finally replaced is equal to or more than the reference value even though the cycle did not arrive, the contamination level analysis unit 510 may determine that the protection film needs to be replaced, and replace the protection film disposed on the outer surface of the cover 110 in advance, which makes it possible to more effectively prevent a reduction in performance of the object detection sensor 100 in consideration of both of the current contamination state and the potential contamination of the protection film.

Only when there is a new protection film to replace the protection film disposed on the outer surface of the cover 110 even though it is determined that the protection film condition is satisfied, the control unit 500 may replace the protection film disposed on the outer surface of the cover 110. When determining whether there is a new protection film, the control unit 500 may determine whether a value is smaller than an outer surface length Length_cover of the cover 110 based on the direction in which the protection film is unwound and disposed on the outer surface of the cover 110, the value being obtained by subtracting a value obtained by multiplying the outer surface length Length_cover of the cover 110 by the number of protection film replacements+1 (Number_change+1) from the total length Length_total of the protection film which is initially applied to the protection film part 200. The reason that 1 is added to the number of protection film replacements is in order to consider the protection film which was first disposed on the outer surface of the cover 110. In other words, the control unit 500 may determine whether a relation of (Length_total−Length_cover*(Number_change+1)<Length_cover) is satisfied.

When it is determined that there is no new protection film, the control unit 500 may inform a user that the protection film part 200 needs to be replaced. At this time, the control unit 500 may inform the user that the protection film part 200 needs to be replaced, through a display device installed in the vehicle (for example, an LCD installed in a cluster unit).

Figure 3:
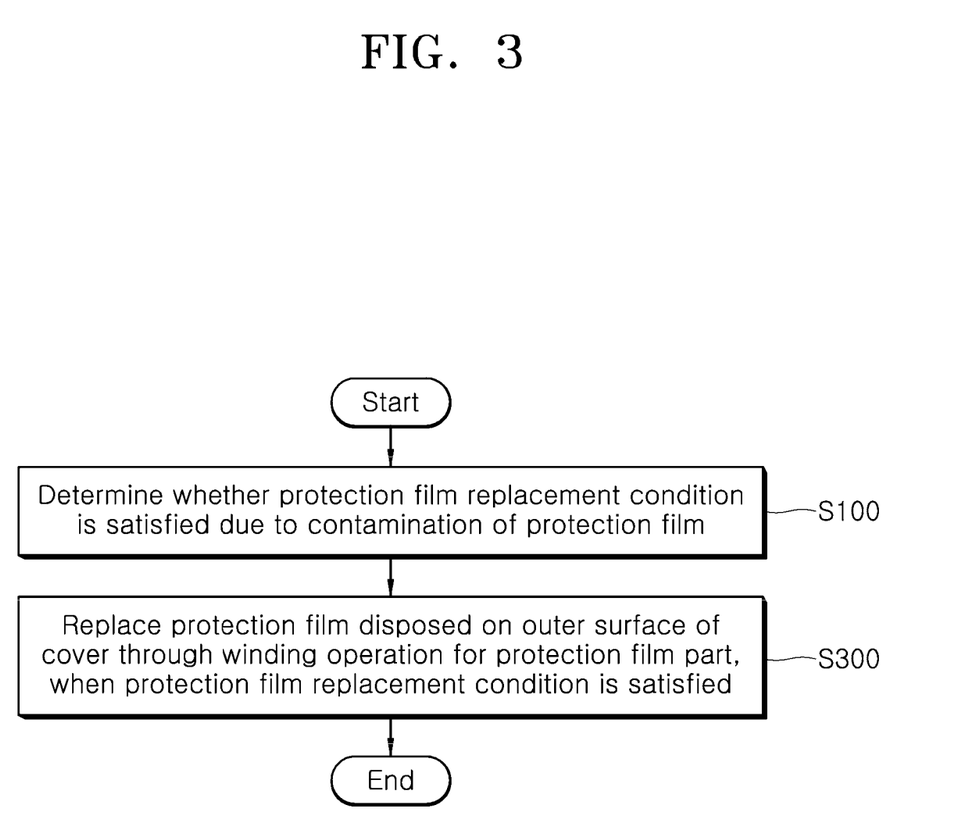
FIGS. 3 and 4 are flowcharts for describing an operating method of an object detection apparatus in accordance with an embodiment of the present invention.
Figure 4:
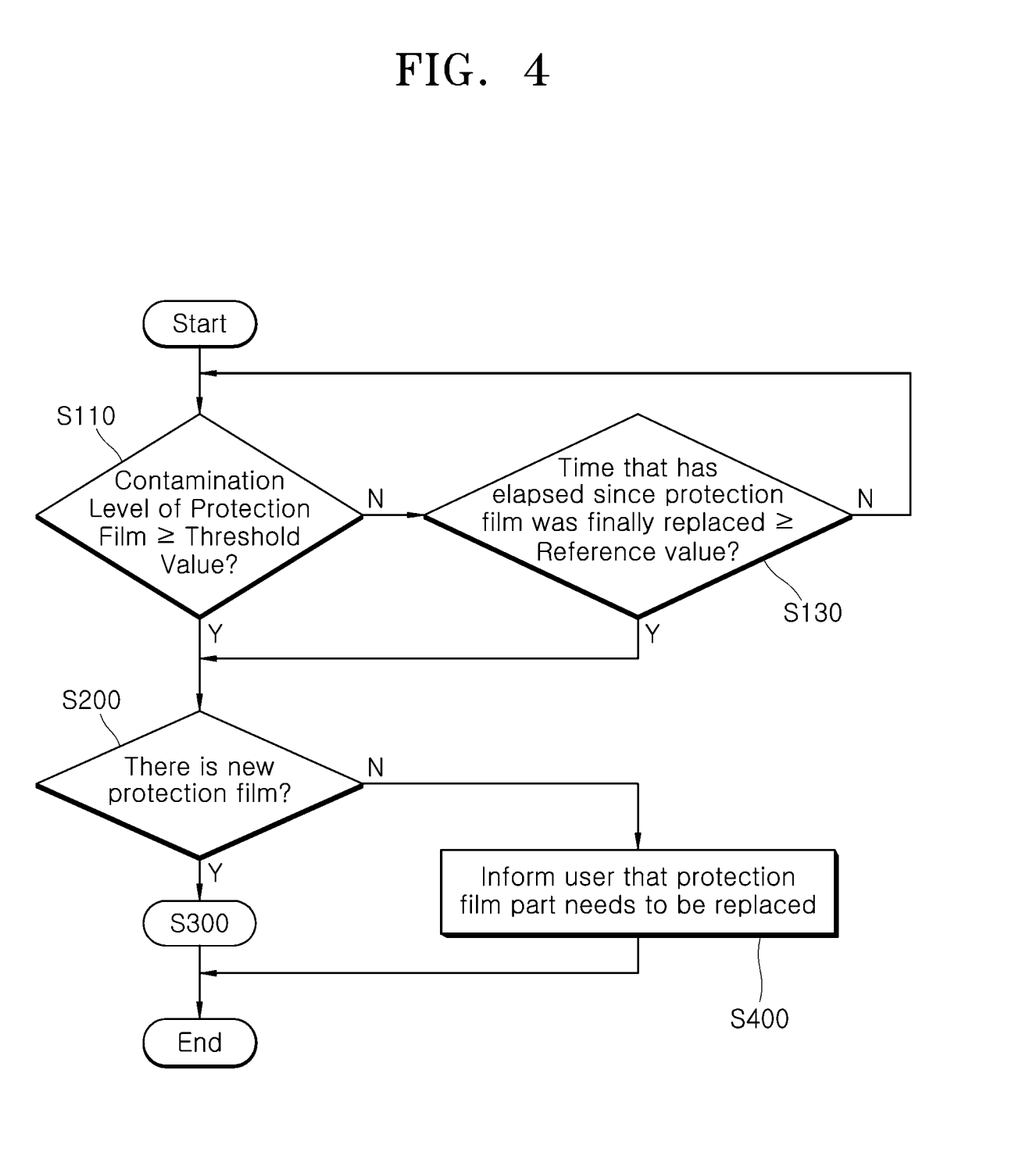

FIGS. 3 and 4 are flowcharts for describing an operating method of the object detection apparatus in accordance with an embodiment of the present invention.

Referring to FIG. 3, the operating method of the object detection apparatus in accordance with the embodiment of the present invention will be described as follows. First, the control unit 500 may determine whether the protection film replacement condition is satisfied, depending on the contamination level of the protection film, at step S100.

Referring to FIG. 4, step S100 will be described in detail as follows. When it is determined that the contamination level of the protection film disposed on the outer surface of the cover 110 at the moment is equal to or more than the preset threshold value, the control unit 500 may determine that the protection film replacement condition is satisfied, at step S110.

When it is determined that the contamination level of the protection film is less than the threshold value, the control unit 500 may determine that the protection film replacement condition is satisfied, in the case that the time that has elapsed since the protection film disposed on the outer surface of the cover 110 was finally replaced is equal to or more than a preset reference value, at step S130.

At this time, step S110 may be repeatedly performed according to a preset cycle, and the cycle may be equal to or less than the reference value.

That is, through step S110, the control unit 500 may periodically determine whether the contamination level of the protection film disposed on the outer surface of the cover 110 at the moment is equal to or more than the preset threshold value, in order to replace the protection film. When it is determined at step S130 that the time that has elapsed since the protection film disposed on the outer surface of the cover 110 was finally replaced is equal to or more than the reference value, the control unit 500 may determine that the protection needs to be replaced, and replace the protection film the control unit 500 on the outer surface of the cover 110 in advance, which makes it possible to more effectively prevent a reduction in performance of the object detection sensor 100 in consideration of both of the current contamination state and the potential contamination of the protection film.

When it is determined at step S100 that the protection film replacement condition is satisfied, the control unit 500 may replace the protection film disposed on the outer surface of the cover 110 through a winding operation for the protection film part 200, thereby preventing a reduction in sensing performance of the object detection sensor 100 due to contamination by foreign matter, at step S300.

In the present embodiment, as illustrated in FIG. 4, the operating method may further include step S200 of determining whether there is a new protection film for replacing the protection film disposed on the outer surface of the cover 110, when it is determined that the protection film replacement condition is satisfied. Thus, at step S300, the control unit 500 may replace the protection film disposed on the outer surface of the cover 110 only when there is a new protection film.

When it is determined at step S200 that there is no new protection film, the control unit 500 may inform a user that the protection film part 200 needs to be replaced, at step S400.

In the present embodiment, the object detection apparatus and the operating method thereof can fundamentally block not only contamination of the sensor over by foreign matter such as dust, dirt, or moisture, but also contamination such as a scratch which may occur on the cover, thereby preventing a reduction in sensing performance of the sensor.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. An object detection apparatus comprising:
    an object detection sensor having a cover for protecting the object detection sensor from foreign matter, and configured to sense a target object by transmitting a scan signal to the target object and receiving a sensing signal reflected from the target object, wherein the scan signal and the sensing signal are respectively transmitted and received through the cover;
    a protection film part comprising a protection film disposed on an outer surface of the cover and configured to prevent contamination of the cover by foreign matter; and
    a control unit configured to control replacement of the protection film disposed on the outer surface of the cover through a winding operation of the protection film part when a protection film replacement condition is satisfied due to contamination of the protection film,
    wherein when a contamination level of the protection film disposed on the outer surface of the cover at a moment is equal to or more than a preset threshold value, the control unit is configured to determine that the protection film replacement condition is satisfied.

2. The object detection apparatus of claim 1, further comprising a roll unit configured to replace the protection film disposed on the outer surface of the cover by performing the winding operation for the protection film part, under control of the control unit.

3. The object detection apparatus of claim 1, wherein when a time period that has elapsed since the protection film disposed on the outer surface of the cover until the protection film is replaced is equal to or more than a preset reference value, the control unit being configured to determine that the protection film replacement condition is satisfied.

4. The object detection apparatus of claim 1, wherein the object detection sensor comprises a Light Detection And Ranging Sensor (LiDAR).

5. An operating method of an object detection apparatus which comprising: an object detection sensor comprising a cover for protecting the object detection sensor from foreign matter, and configured to sense a target object by transmitting a scan signal to the target object and receiving a sensing signal reflected from the target object, wherein the scan signal and the sensing signal are respectively transmitted and received through the cover; and a protection film part comprising a protection film disposed on an outer surface of the cover and configured to prevent contamination of the cover by foreign matter, the operating method comprising the steps of:
    determining, by a control unit, whether a protection film replacement condition is satisfied due to contamination of the protection film, and
    replacing, controlled by the control unit, the protection film disposed on the outer surface of the cover through a winding operation of the protection film part when the protection film replacement condition is satisfied,
    wherein the step of determining whether the protection film replacement condition is satisfied comprises a first determination step in which the controller is configured to determine that the protection film replacement condition is satisfied when a contamination level of the protection film disposed on the outer surface of the cover at a point in time is equal to or more than a preset threshold value.

6. The operating method of claim 5, wherein when it is determined that the contamination level of the protection film is less than the preset threshold value, the step of determining whether the protection film replacement condition is satisfied further comprises a second determination step in which the controller is configured to determine that the protection film replacement condition is satisfied when a time period that has elapsed since the protection film was disposed on the outer surface of the cover is equal to or more than a preset reference value.

7. The operating method of claim 6, wherein the first determination step is repeatedly performed according to a preset cycle, and a duration of the preset cycle is equal to or less than the preset reference value.

8. The operating method of claim 5, further comprising the step of determining, by the control unit, whether there is a new protection film for replacing the protection film disposed on the outer surface of the cover when it is determined that the protection film replacement condition is satisfied,
    wherein, in the step of replacing of the protection film, the control unit is configured to control replacement of the protection film disposed on the outer surface of the cover when it is determined that there is the new protection film.

9. The operating method of claim 8, further comprising the step of informing, by the control unit, a user that the protection film part needs to be replaced when it is determined that there is no new protection film.

10. An object detection apparatus comprising:
an object detection sensor having a cover for protecting the object detection sensor from foreign matter, and configured to sense a target object by transmitting a scan signal to the target object and receiving a sensing signal reflected from the target object, wherein the scan signal and the sensing signal are respectively transmitted and received through the cover;
a protection film part comprising a protection film disposed on an outer surface of the cover and configured to prevent contamination of the cover by foreign matter; and
a control unit configured to control replacement of the protection film disposed on the outer surface of the cover through a winding operation of the protection film part when a protection film replacement condition is satisfied due to contamination of the protection film,
wherein when a time period that has elapsed since the protection film disposed on the outer surface of the cover until the protection film is replaced is equal to or more than a preset reference value, the control unit being configured to determine that the protection film replacement condition is satisfied.

\* \* \* \* \*